United States Patent
Safai et al.

(10) Patent No.: US 10,983,074 B2
(45) Date of Patent: Apr. 20, 2021

(54) VISUAL LIGHT CALIBRATOR FOR AN X-RAY BACKSCATTERING IMAGING SYSTEM

(71) Applicant: The Boeing Company, Chicago, IL (US)

(72) Inventors: Morteza Safai, Newcastle, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 868 days.

(21) Appl. No.: 15/592,793

(22) Filed: May 11, 2017

(65) Prior Publication Data

US 2018/0328869 A1    Nov. 15, 2018

(51) Int. Cl.
 *G01N 23/203*  (2006.01)
 *G01N 23/20008* (2018.01)

(52) U.S. Cl.
 CPC ..... *G01N 23/203* (2013.01); *G01N 23/20008* (2013.01); *G01N 2223/303* (2013.01)

(58) Field of Classification Search
 CPC ........... G01N 23/203; G01N 23/20008; G01N 2223/303
 See application file for complete search history.

(56) References Cited

U.S. PATENT DOCUMENTS

| | | | |
|---|---|---|---|
| 4,494,001 A | 1/1985 | Peck | |
| 6,435,717 B1 * | 8/2002 | Kohler | A61B 6/107 378/205 |
| 7,198,404 B2 * | 4/2007 | Navab | A61B 5/0059 378/206 |
| 7,463,714 B2 | 12/2008 | Edwards et al. | |
| 7,508,910 B2 | 3/2009 | Safai et al. | |
| 7,529,343 B2 | 5/2009 | Safai et al. | |
| 7,599,471 B2 | 10/2009 | Safai et al. | |
| 7,623,626 B2 | 11/2009 | Safai et al. | |

(Continued)

OTHER PUBLICATIONS

Watson, Paul Joseph, "Police to Get X-Ray Scanner for Vehicle Inspections & 'Public Safety,'" website of Infowars, http://www.infowars.com/police-to-get-x-ray-scanner-for-vehicle-inspections-public-safety/ (Jun. 23, 2014).

(Continued)

*Primary Examiner* — Chih-Cheng Kao

(57) ABSTRACT

An x-ray backscattering imaging system creating a backscatter image representing a structure is disclosed. The system includes a drum rotatable about an axis of rotation at a rotational speed, a radioactive source, a container, at least one collimator, at least one light emitting element, and a plurality of backscatter detectors. The radioactive source is connected to the drum and generates x-ray beams. The container houses the radioactive source and is constructed of a material that substantially blocks the x-ray beams generated by the radioactive source. The collimator is defined by the container and has a length and an aperture, where the collimator filters a stream of x-rays generated by the radioactive source such that the x-ray beams traveling substantially parallel with respect to the length of the collimator pass through the aperture. The light emitting element generates visible light and is positioned to direct the visible light into the collimator.

22 Claims, 8 Drawing Sheets

(56) References Cited

U.S. PATENT DOCUMENTS

| | | | |
|---|---|---|---|
| 7,649,976 | B2 | 1/2010 | Georgeson et al. |
| 8,033,724 | B2 | 10/2011 | Edwards et al. |
| 8,094,781 | B1 | 1/2012 | Safai et al. |
| 9,305,344 | B2 | 4/2016 | Georgeson et al. |
| 9,398,676 | B2 | 7/2016 | Grimshaw et al. |
| 2005/0152499 | A1* | 7/2005 | Zhao .................... G21K 1/04 378/147 |
| 2010/0327174 | A1 | 12/2010 | Edwards et al. |
| 2011/0169990 | A1* | 7/2011 | Higuchi ................ H03K 4/48 348/302 |
| 2012/0039447 | A1* | 2/2012 | Lalena .................. A61B 6/08 378/206 |
| 2013/0195248 | A1 | 8/2013 | Rothschild et al. |
| 2015/0323477 | A1 | 11/2015 | Edwards et al. |
| 2016/0033426 | A1* | 2/2016 | Georgeson ........... G01N 23/203 378/87 |

OTHER PUBLICATIONS

Addicott, Benjamin Teichman, Characterization and Optimization of Radiography by Selective Detection Backscatter X-Ray Imaging Modality,: A Thesis Presented to the Graduate School of the University of Florida in Partial Fulfillment of the Requirements for Degree of Master of Engineering, University of Florida, pp. i-222 (2006).

* cited by examiner

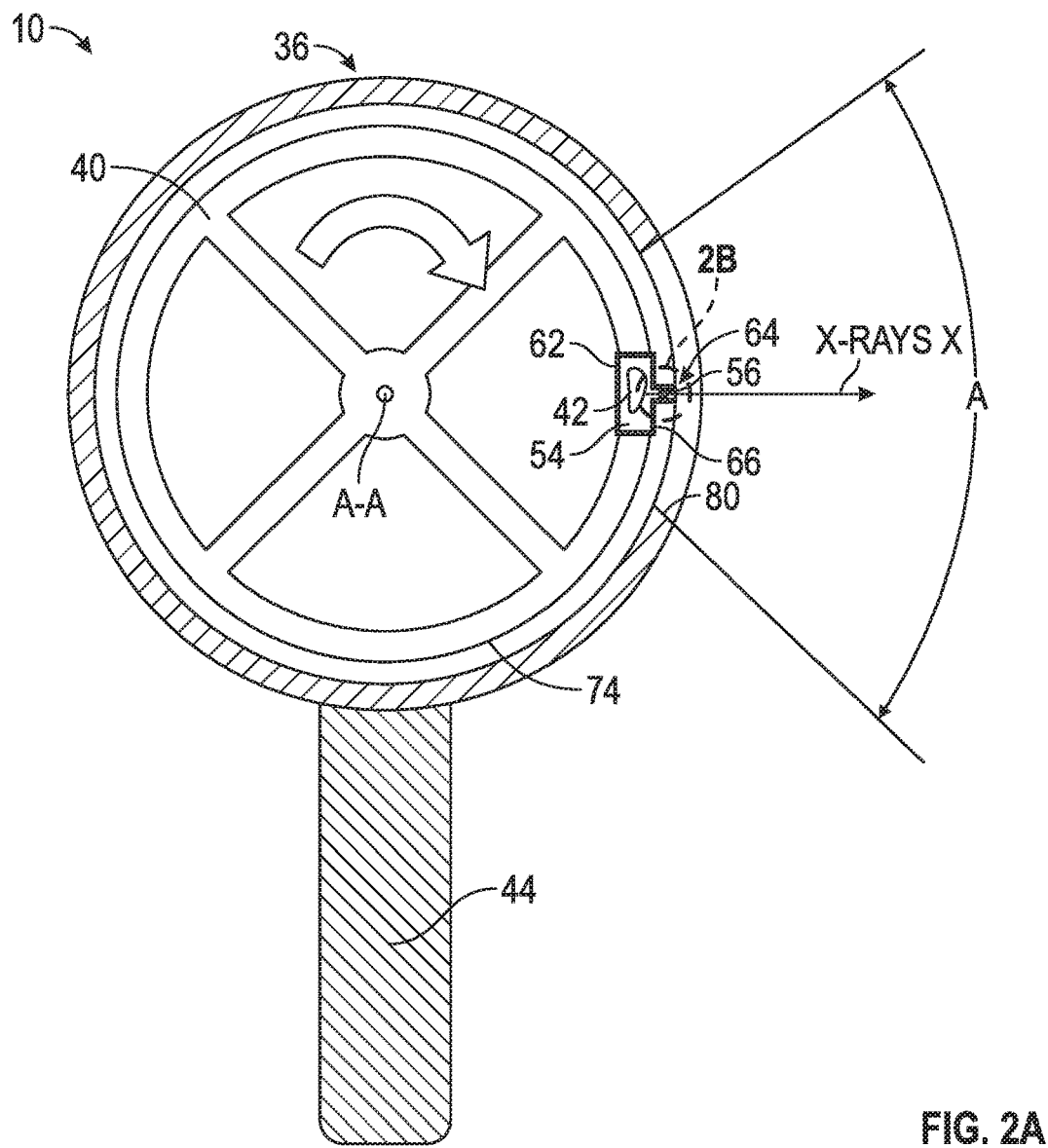
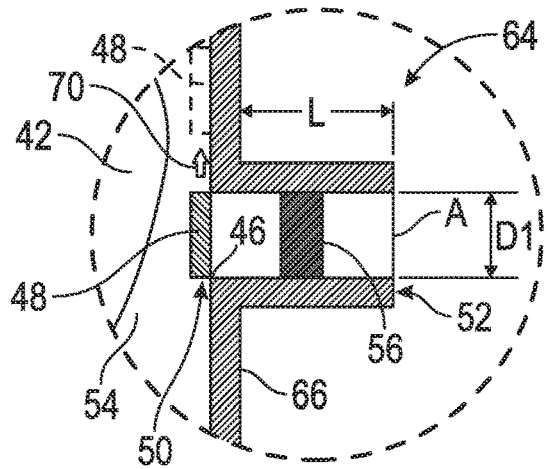
FIG. 2A
FIG. 2B

VISUAL LIGHT CALIBRATOR FOR AN X-RAY BACKSCATTERING IMAGING SYSTEM

FIELD

The disclosed system relates to a calibrator for an x-ray backscattering imaging system and, more particularly, to an x-ray backscattering imaging system including a light emitting element for generating visible light parallel to and coincident with a stream of x-rays.

BACKGROUND

It is often necessary to inspect internal components of various types of objects, such as buildings, automobiles, containers, aircraft, or maritime vessels. Inspection of such structures and facilities by partial or complete disassembly of the structures to visually inspect internal components of interest may be impracticable. One technique for inspecting such components utilizes x-ray backscattering imaging systems. X-ray backscattering imaging systems provide an inspection process in which x-rays are reflected backwards from within the object or component of interest and recorded by a detector or detectors. X-ray backscattering imaging systems do not need to be powerful enough to transmit x-rays entirely through the component of interest and the surrounding components. Rather, partial penetration to a depth of interest is all that is required.

One specific type of backscattering imaging system includes a rotating drum, one or more collimators, and a radioactive source. Each collimator filters a stream of x-rays generated by the radioactive source. As the drum of the backscattering imaging system rotates during operation, the x-rays that are substantially parallel with respect to a corresponding collimator exit the collimator through a corresponding aperture. The x-rays that exit the aperture may be referred to as x-ray beams. The x-ray beams are then directed upon an object to be inspected by the backscattering imaging system.

The x-ray beams are aligned with one another in order to create a bright and uniform beam. If the backscattering imaging system includes multiple collimators, then x-ray flux exiting each of the apertures needs to be of an equal size and amount. Furthermore, multiple collimators may produce images with vertical streaking. The vertical streaking is caused by differences in the alignments of apertures in the backscattering imaging system, which results in diminished and inconsistent flux output from the apertures. An operator may attempt to align the apertures by a manual trial and error process, but such efforts are typically time consuming and usually only provide moderate improvement in the image quality. In another approach, intensity variations between apertures may be partially compensated using automated averaging during the calibration process. However, this approach is only partially effective and may not substantially eliminate the vertical streaking in the images.

SUMMARY

In one aspect, an x-ray backscattering imaging system creating a backscatter image representing a structure is disclosed. The system includes a drum rotatable about an axis of rotation at a rotational speed, a radioactive source, a container, at least one collimator, at least one light emitting element, and a plurality of backscatter detectors. The radioactive source is connected to the drum and generates x-ray beams. The container houses the radioactive source and is constructed of a material that substantially blocks the x-ray beams generated by the radioactive source. The collimator is defined by the container and has a length and an aperture, where the collimator filters a stream of x-rays generated by the radioactive source such that the x-ray beams traveling substantially parallel with respect to the length of the collimator pass through the aperture. The light emitting element generates visible light and is positioned to direct the visible light into the collimator. The collimator filters a stream of visible light generated by the light emitting element such that the visible light traveling substantially parallel with respect to the length of the collimator passes through the aperture, and the visible light passing through the aperture is coincident and substantially parallel with respect to the x-ray beams that pass through the aperture. The backscatter detectors are for detecting backscattering radiation created as the x-rays generated by the radioactive source scatter back from the structure.

In another aspect, a method of calibrating an x-ray backscattering imaging system is disclosed. The method comprises rotating a drum about an axis of rotation at a rotational speed, where a container is connected to the drum and houses a radioactive source that generates x-ray beams. The method further includes directing visible light generated by a light emitting element into a collimator defined by the container. The collimator includes a length and an aperture. The method includes filtering a stream of visible light generated by the light emitting element by the collimator. The method further includes allowing the visible light traveling substantially parallel with respect to the length of the collimator to pass through the aperture. The visible light passing through the aperture is coincident and substantially parallel with respect to the x-ray beams that pass through the aperture. The method also includes directing the visible light exiting the aperture of the collimator upon a surface to create a light spot. Finally, the method also includes adjusting at least one of a size, shape, and location of the aperture of the collimator based on the light spot.

Other objects and advantages of the disclosed method and system will be apparent from the following description, the accompanying drawings and the appended claims.

BRIEF DESCRIPTION OF THE DRAWINGS

FIG. 2A is a side cross-sectioned view of the x-ray backscattering imaging system shown in FIG. 1;

FIG. 2B is an enlarged view of a collimator shown in FIG. 2A, where the collimator contains a radioactive source and a light emitting element that is a light emitting diode (LED);

DETAILED DESCRIPTION

Figure 1:
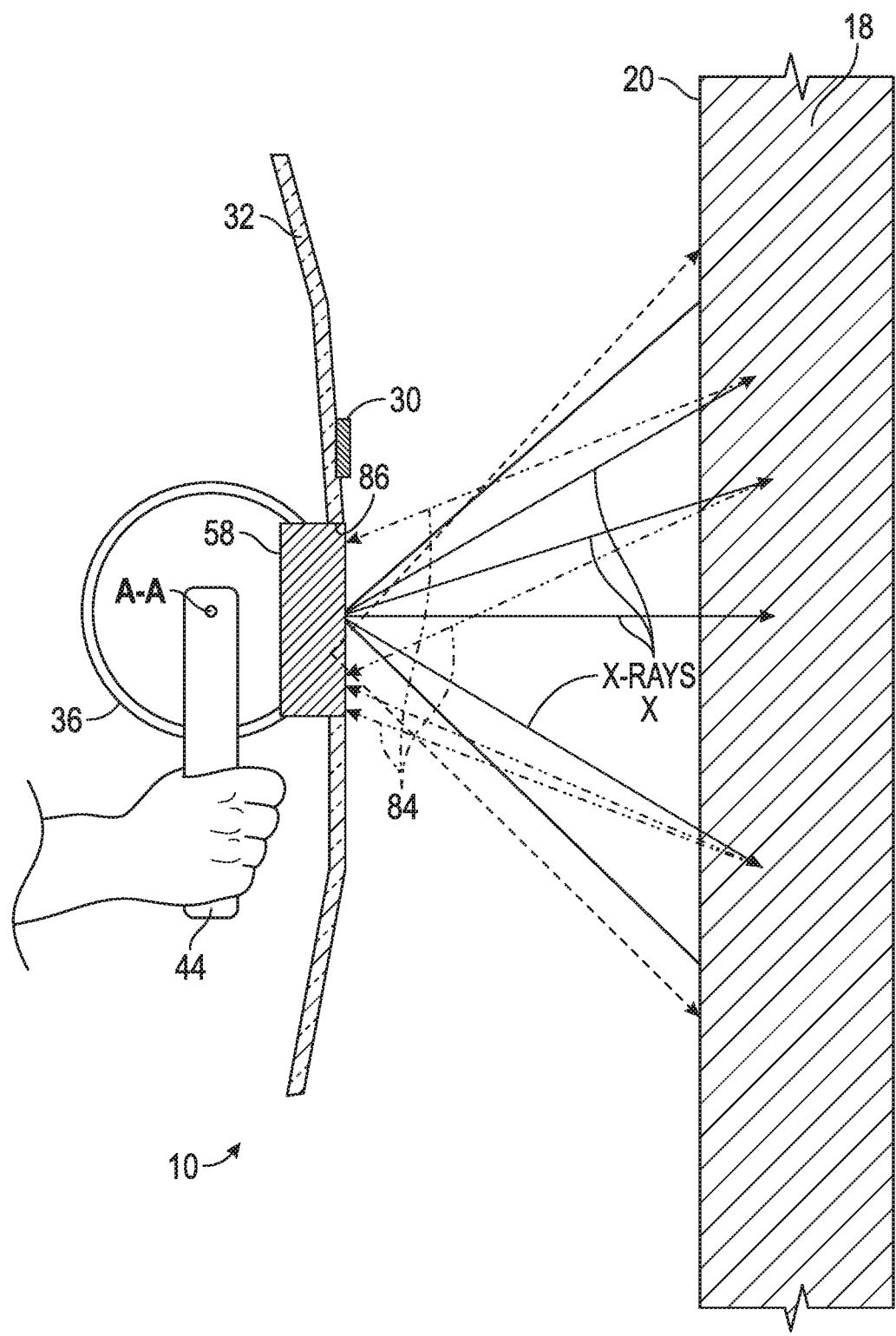
FIG. 1 is a schematic illustration of an exemplary x-ray backscattering imaging system for inspecting a structure.

As shown in FIG. 1, the disclosed x-ray backscattering imaging system 10 according to an aspect of the disclosure is used to inspect an object or structure 18. In one approach, the structure 18 may be a multilayer object such as, for example, a building. The x-ray backscattering imaging system 10 may include a two-dimensional optical detector 22 (shown in FIG. 5), an on-board positioning system 30, a front shield 32, an exterior shield 36, a rotating drum 40 (shown in FIG. 2A), a radioactive source 42 (shown in FIG. 2A), a handle 44, at least one light emitting element 56 (shown in FIG. 2B), and one or more backscatter detectors 58. The x-ray backscattering imaging system 10 includes a calibration feature that utilizes visible light generated by the light emitting element 56 shown in FIG. 2B to align, shape, and size x-ray beams generated by the radioactive source 42, and is explained in greater detail below.

Turning back to FIG. 1, in one embodiment, the x-ray backscattering imaging system 10 is relatively lightweight and portable. Accordingly, an operator may move the backscattering imaging system 10 in a generally horizontal direction with respect to the structure 18 in order to inspect one or more areas of the structure 18. The on-board positioning system 30 tracks the resulting horizontal displacement of the backscattering imaging system 10. The on-board positioning system 30 is any type of device for detecting and measuring the horizontal displacement of the x-ray backscattering imaging system 10 in a horizontal direction with respect to the structure 18. For example, the on-board positioning system 30 may be an inertial measuring unit (IMU), a global positioning system (GPS), at least one acoustic distance sensor, an optical encoder configured to read an exterior surface 20 of the structure 18, one or more encoder wheels that roll against the exterior surface 20 of the structure 18, or one or more linear encoders.

Referring to FIG. 2A, in one approach the radioactive source 42 may be a gamma source that emits gamma radiation. Some examples of gamma sources include, but are not limited to, Cesium-137, Cobalt-60, and Iridium-192. Some other types of radioactive elements that may be used include, for example, alpha sources, beta sources, or neutron sources. The radioactive source 42 and the visible light element 56 are both housed within a container 62. In one embodiment, the radioactive source 42 may be relatively small and lightweight, thereby enabling the disclosed x-ray backscattering imaging system 10 to be portable and easily held by a user. The container 62 is constructed of a material that substantially blocks the x-ray beams generated by the radioactive source 42 from exiting the container 62 such as, for example, lead or tungsten. The container 62 defines a cavity 54 that contains the radioactive source 42.

In the embodiment as shown in FIG. 2A, the container 62 defines a collimator 64 located along an outermost edge or face 66 of the container 62. FIG. 2B is an enlarged view of the collimator 64 shown in FIG. 2A. In the non-limiting embodiment as shown, the light emitting element 56 is positioned within the collimator 64. The light emitting element 56 is configured to generate visible light that is seen by the human eye, which typically includes wavelengths from about 390 nanometers to about 700 nanometers. In the embodiment as shown in FIG. 2B, the light emitting element 56 is a light emitting diode (LED) or an organic LED (OLED). However, in another embodiment shown in FIG. 9, the light emitting element 56 is a diode laser, which is explained in greater detail below.

The collimator 64 defines a length L and an aperture opening A. The collimator 64 collimates the radiation generated by the radioactive source 42. Specifically, the collimator 64 filters a stream of x-rays generated by the radioactive source 42 such that only the x-rays traveling substantially parallel with respect to the length L of the collimator 64 are allowed to pass through and exit the aperture A. Similarly, the collimator 64 also collimates the visible light generated by the light emitting element 56. The visible light also travels in a path along the length L of the collimator 64 and exits the aperture A. The visible light that passes through the aperture A is coincident to and substantially parallel with respect to the x-ray beams that also pass through the aperture A.

Figure 4:
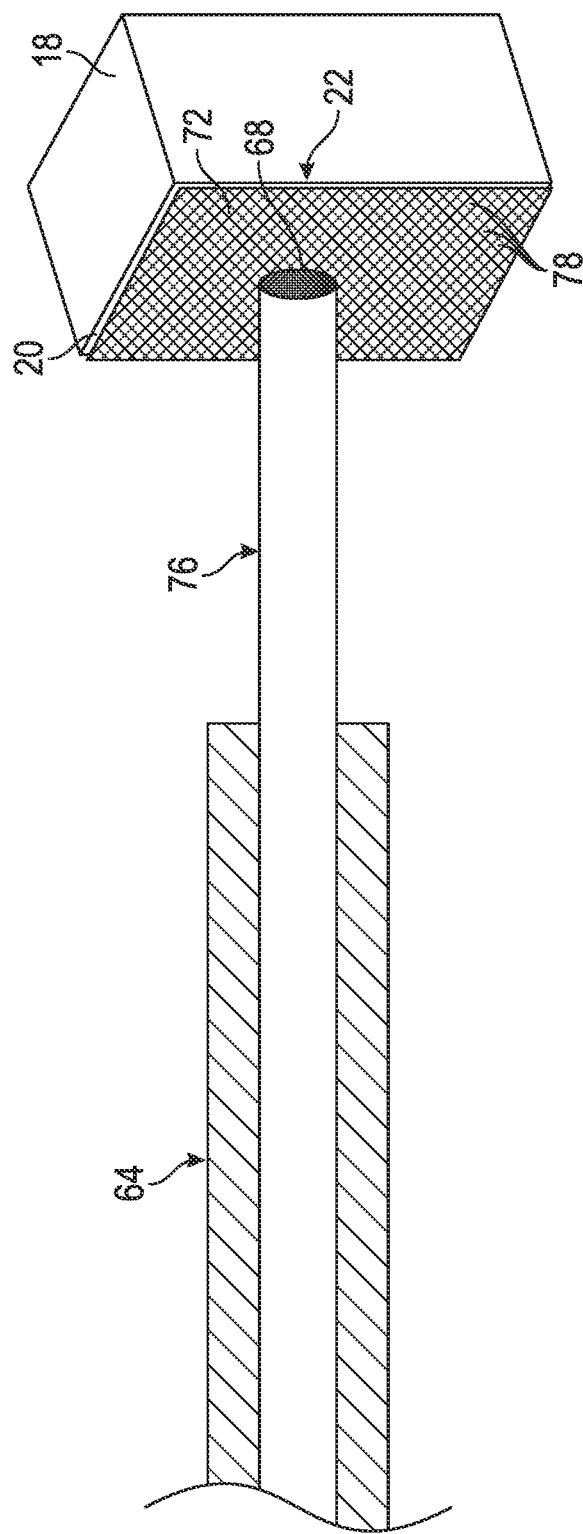
FIG. 4 is a schematic illustration of a collimator shown in FIGS. 2A and 2B and a two-dimensional optical detector.

Referring generally to both FIGS. 2B and 4, the visible light exiting the aperture A of the collimator 64 is directed upon a surface 72 of the optical detector 22 to create a silhouette or light spot 68. The light spot 68 is representative of the x-rays that also exit the aperture A of the collimator 64. The light spot 68 created by the visible light exiting the aperture A of the collimator 64 is representative of the x-rays generated by the radioactive source 42. Specifically, the light spot 68 is representative of the size, shape, and location of the x-rays beams generated by the radioactive source 42. Thus, an operator calibrates the x-ray beam based on the visible light spot 68, which is described in greater detail below. Those of ordinary skill in the art will readily appreciate that a distance measured between the optical detector 22 and the aperture A of the collimator 64 is increased or decreased in order to change the size of the light spot 68 viewed upon the surface 72 of the optical detector 22.

In the embodiment as shown in FIGS. 2A and 2B, the light emitting element 56 is positioned within the collimator 64 so as to intersect with the x-ray beams generated by the radioactive source 42. This position of the light emitting element 56 is possible because LEDs and OLEDs are transparent to radiation, and therefore do not block the x-rays when the radioactive source 42 generates the x-rays. In one embodiment, the LED is removable so that a replacement LED may be installed in the event the original LED is no longer able to generate visible light.

The light emitting element 56 is positioned to direct visible light into the collimator 64. In the embodiment as shown in FIG. 2B, the light emitting element 56 is positioned between a proximate end 50 and a distal end 52 of the collimator 64. However, it is to be appreciated that the light emitting element 56 may be placed at any position along the length L within the collimator 64. For example, in one approach the light emitting element 56 may be positioned within the collimator 64 directly adjacent to the aperture A, which may result in brighter, more well-defined beams of visible light. In another embodiment, the light emitting element 56 may be positioned within the cavity 54 of the container 62 in a location that is directly adjacent to an opening 46 at the proximate end 50 of the collimator 64.

As seen in FIG. 2B, a shutter 48 may be placed at the opening 46 located at the proximate end 50 of the collimator 64. Similar to the container 62, the shutter 48 is also constructed of a relatively dense material to substantially shield or stop the radiation generated from the radioactive source 42. During calibration of the x-ray backscattering imaging system 10, the shutter 48 is positioned at the opening 46 to block the x-rays generated by the radioactive source 42 from entering the collimator 64. Instead, the visible light element 56 is activated and generates visible light that exits the aperture A of the collimator 64 to create the light spot 68 (FIG. 4). Therefore, the size, shape, and location of the light spot 68 is adjustable, without subjecting an operator to the radiation generated by the radioactive source 42.

Once calibration is complete, the operator deactivates the light emitting element 56 and then actuates the shutter 48 in a direction away from the opening 46 in order to allow for x-rays to exit the collimator 64. Specifically, in the embodiment as shown in FIG. 2B, the shutter 48 is actuated in a sideways direction 70, and away from the opening 46 of the collimator 64. The shutter 48 may be actuated by a motor (not illustrated) such as a nanomotor.

Figure 7:
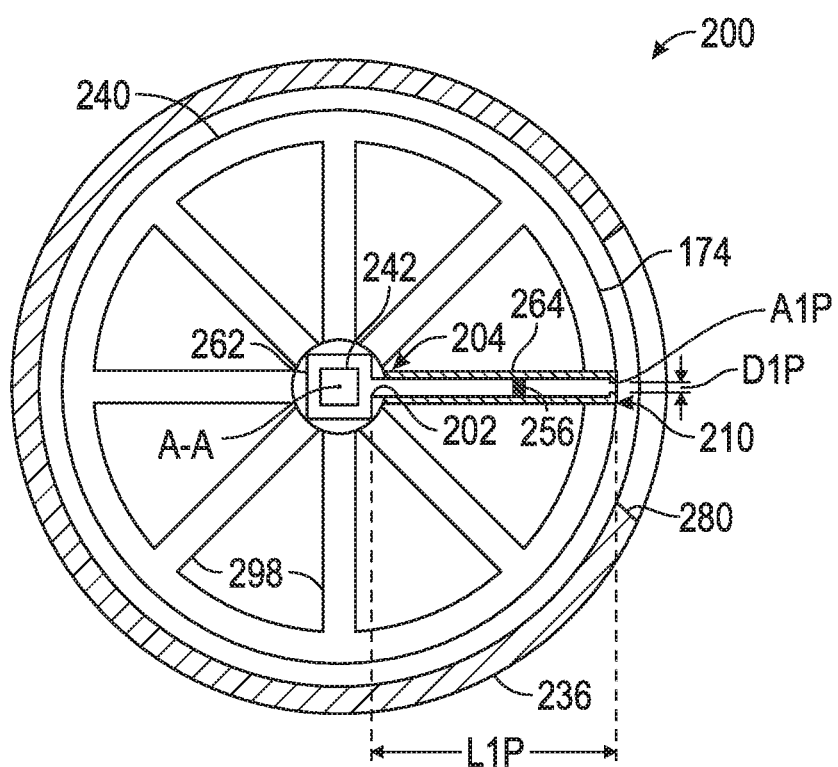
FIG. 7 is an alternative illustration of the x-ray backscattering imaging system shown in FIG. 1 where a radioactive source is placed within a rotating drum having a single collimator and multiple spokes.

Turning back to FIG. 2A, the container 62 may be connected to the drum 40. The drum 40 may be housed or encased within the exterior shield 36, and is rotatable about an axis of rotation A-A at a rotational speed. In the non-limiting example as shown, the exterior shield 36 includes a generally cylindrical profile. In the embodiment as shown in FIG. 2A, the container 62 may be located along an outermost surface 74 of the drum 40. However, in an alternative approach, the container 62 is housed within the drum 40 as well, which is illustrated in FIG. 7 and described in greater detail below.

The x-rays generated by the radioactive source 42 or the visible light generated by the light emitting element 56 travel through a scanning window 80, which is an opening defined by the exterior shield 36. The exterior shield 36 is constructed of a relatively dense material having a high atomic number that may substantially shield or stop the radiation generated from the radioactive source 42 such as, for example, titanium or lead. The scanning window 80 may be constructed of a material that allows for x-rays X and visible light exiting the collimator 64 to pass through. The scanning window 80 may also be used to filter out lower energy x-rays exiting the collimator 64. In one non-limiting example, the scanning window 80 may be constructed of a relatively thin sheet of aluminium or copper having a thickness ranging from about one-tenth of a millimeter to about five millimeters. In another approach, the scanning window 80 may be an open void within the exterior shield 36.

As seen in FIG. 2A, the scanning window 80 may be formed as an angle A around the exterior shield 36. In one approach, the angle A may range from about ten degrees to about one hundred and twenty degrees with respect to the axis of rotation A-A of the drum 40. The specific dimensions of the angle A may depend on a desired height of the backscatter image generated by the x-ray backscattering imaging system 10. For example, a smaller angle A results in a shorter backscatter image, while a larger angle A results in a taller backscatter image.

As the drum 40 rotates during operation of the x-ray backscattering imaging system 10, the x-rays X or the visible light exiting the collimator 64 selectively pass through the scanning window 80 within the exterior shield 36 at a specific frequency, and are directed towards the structure 18 (FIG. 1). Turning back to FIG. 1, the front shield 32 may be used in the event x-rays are exiting the collimator 64. The front shield 32 shields or blocks backscattering radiation 84 created as the x-rays X generated by the x-ray backscattering imaging system 10 scatter back from the structure 18. The shield 32 is constructed of any type of relatively dense material that may substantially shield or stop the radiation generated from the radioactive source 42. The shield 32 defines an aperture or opening 86. Referring to both FIGS. 1 and 2A, the x-rays exiting the scanning window 80 within the exterior shield 36 pass through the opening 86 of the shield 32 and towards the structure 18.

Figure 3:
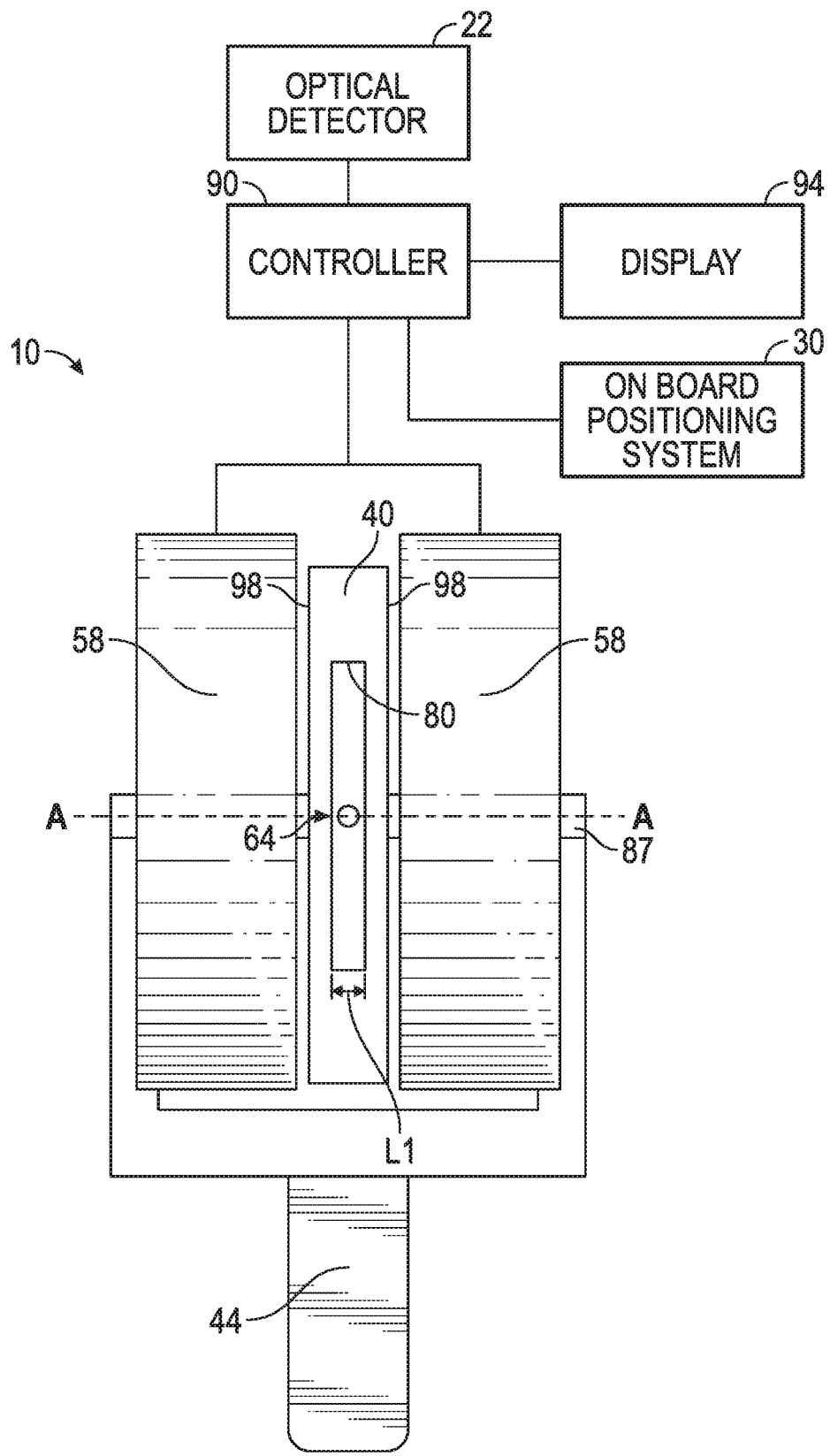
FIG. 3 is a front schematic view of the x-ray backscattering imaging system, where a shield has been removed.

FIG. 3 is a front view of the x-ray backscattering imaging system 10, where the handle 44, the drum 40, and the backscatter detectors 58 are illustrated (the front shield 32 has been removed in FIG. 3). As seen in FIG. 3, the scanning window 80 may include a horizontal length L1. The horizontal length L1 of the scanning window 80 should be sized to be at least as wide as the aperture opening diameter D1 of the collimator 64 (shown in FIG. 2B). Continuing to refer to FIG. 3, the handle 44 may be rotatably attached to the drum 40. Specifically, the handle 44 may include a rod 87 located along the axis of rotation A-A of the drum 40. In the example as illustrated in FIG. 3, a backscatter detector 58 is located on opposing sides 98 of the drum 40. The backscatter detectors 58 detect backscattering radiation 84 created as the x-rays generated by the radioactive source 42 scatter back from the structure 18. The backscatter detectors 58 generate a signal based on the backscattering radiation 84 detected. The backscatter detectors 58 may be, for example, solid state detectors or scintillators.

FIG. 4 is a schematic illustration of the collimator 64, collimated light 76 generated by the light emitting element 56, and the two-dimensional optical detector 22. The two-dimensional optical detector 22 may also be referred to as a position sensitive device, and refers to a component that is based on a silicon p-i-n diode. The optical detector 22 is temporarily placed in front of the exterior surface 20 of the structure 18 to be inspected by the backscattering imaging system 10. As seen in FIG. 4, the collimated light 76 exits the aperture A of the collimator 64, and is directed upon the surface 72 of the optical detector 22 to create the light spot 68. The surface 72 of the optical detector 22 includes a plurality of pixels 78 arranged in a grid pattern. The optical detector 22 creates a voltage at each pixel 78 that is illuminated by the light spot 68. The voltage is used to determine the size, shape, and location of the light spot 68.

Turning back to FIG. 3, the x-ray backscattering imaging system 10 also includes a controller 90 in signal communication with a display 94. The controller 90 is in signal communication with backscatter detectors 58, the optical detector 22, and the on-board positioning system 30. The controller 90 refers to, or is part of, an application specific integrated circuit (ASIC), an electronic circuit, a combinational logic circuit, a field programmable gate array (FPGA), a processor (shared, dedicated, or group) that executes code, or a combination of some or all of the above, such as in a system-on-chip.

The controller 90 generates the backscatter image representing an interior and/or an opposing side of the structure 18 (FIG. 1) upon the display 94. The backscatter image is based on a position signal received from the on-board positioning system 30. The position signal indicates horizontal position information relating to the location of the x-ray backscattering imaging system 10 relative to the structure 18 as the x-ray backscattering imaging system 10 is moved in a horizontal direction. The controller 90 correlates the movement of the x-ray backscattering imaging system 10 (FIG. 1) in the horizontal direction as well as a vertical scan movement of the radioactive source 42 with a density of the x-ray backscatter 84 detected by the backscatter detectors 58. Referring to FIGS. 1, 2A, and 3, the vertical scan movement of the radioactive source 42 may be defined based on an angle of the x-rays X exiting the collimator 64 as well as a distance the x-rays X exiting the collimator 64 may travel before being backscattered by the structure 18. The controller 90 determines the backscatter image based on the horizontal movement of the x-ray backscattering imaging system 10 relative to the structure 18, the vertical scan movement of the radioactive source 42, and the density of the x-ray backscatter 84 detected by the backscatter detectors 58.

Figure 5:
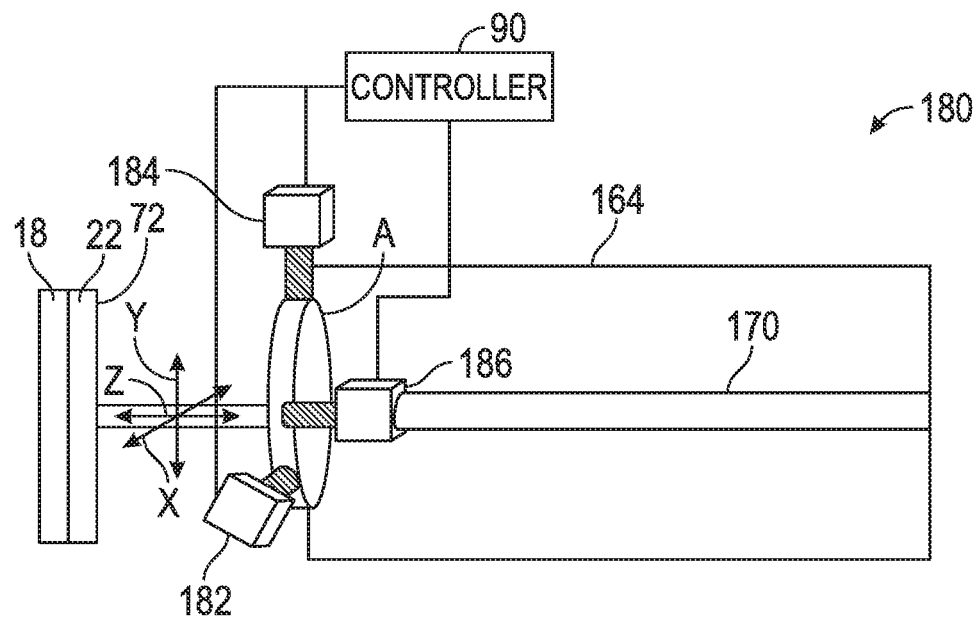
FIG. 5 illustrates an alignment system that adjusts a location of an aperture opening of the collimator shown in FIGS. 2A and 2B.
Figure 6:
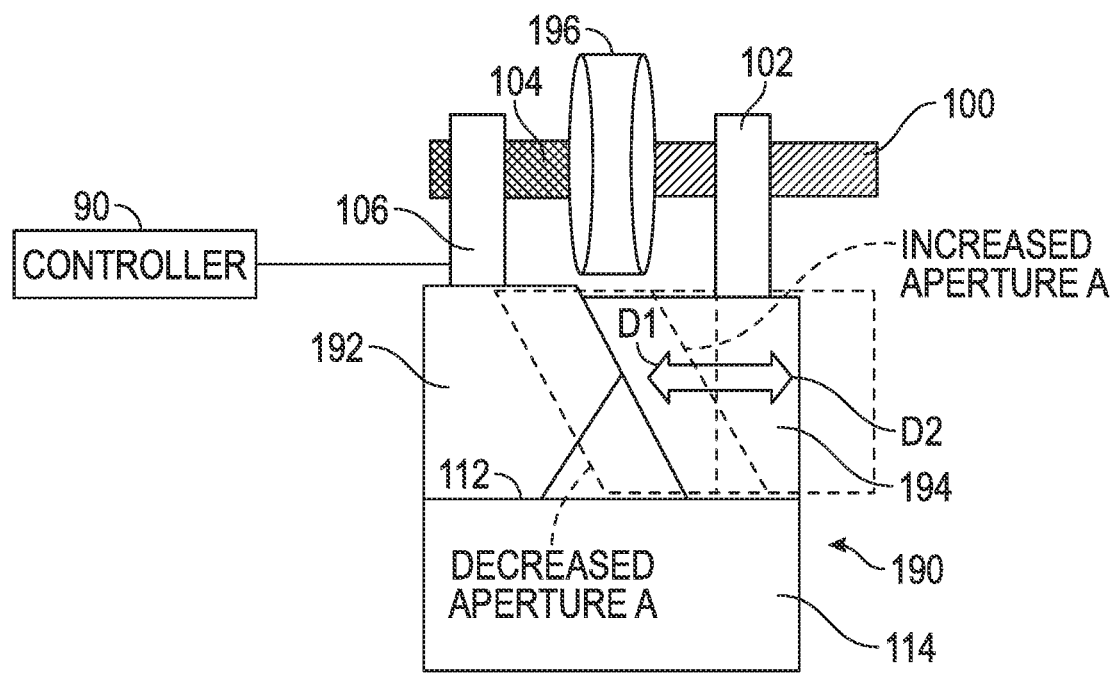
FIG. 6 illustrates an adjustment mechanism that adjusts a size of the aperture opening of the collimator shown in FIGS. 2A and 2B.

In one embodiment, the size, shape, and location of the light spot 68 is adjusted automatically by the controller 90 of the x-ray backscattering imaging system 10. Referring to FIGS. 2A, 3, and 4, an operator may pre-select or program a shape, size, and location of the light spot 68, where the pre-selected light spot is referred to as the reference light spot. The controller 90 includes a feedback control system, which identifies the difference between the actual size of the light spot 68 (which is indicated by the voltage generated by the optical detector 22) and the reference light spot. The controller 90 adjusts the location of the aperture A using an alignment system 180, which is illustrated in FIG. 5 and is described in greater detail below. The controller 90 also adjusts the size of the light spot 68 using a sizing mechanism 190, which is illustrated in FIG. 6 and is described in greater detail below. The controller 90 continues to adjust the alignment system 180 and the sizing mechanism 190 until the size, shape, and location of the light spot 68 (FIG. 4) substantially matches the size, shape, and location of the reference light spot.

In the event the x-ray backscattering imaging system 10 includes more than one collimator (seen in FIG. 8), then the controller 90 adjusts each aperture of each collimator in a similar fashion. Specifically, each additional aperture is adjusted by comparing a corresponding light spot to either the reference light spot, or to an initial light spot 68 generated by the x-ray backscattering imaging system 10.

Referring to FIGS. 1, 2A, 2B, 3 and 4, in another embodiment, an operator manually adjusts at least one of a size, shape, and location of the aperture A of the collimator 64 based on the light spot. Specifically, the optical detector 22 shown in FIG. 4 is optional and may be omitted in some embodiments. Instead, the visible light passing through the aperture A of the collimator 64 is directed upon an exterior surface 20 of the structure 18 (FIG. 1) and creates a light spot 68 (the light spot 68 is not shown in FIG. 1). Accordingly, the light spot 68 is viewed directly upon the exterior surface 20 of the structure 18. The operator adjusts the size, shape, and location of the light spot 68 manually using an external computer (not illustrated) that is connected to the x-ray backscattering imaging system 10. The external computer may be, for example, a desktop computer, a tablet computer, or a smartphone that includes imaging software and a display. The operator may view previous images of the light spot 68 upon the display of the external computer, while dynamically adjusting the size, shape, and location of the aperture A. Adjustment of the size, shape, and location of the aperture A is described below and is shown in FIGS. 5 and 6.

In one embodiment, the operator changes the location of the aperture A using the alignment system 180 illustrated in FIG. 5. A beam 170 enters the collimator 164, is collimated, and then passes through the aperture A. It is to be appreciated that the beam 170 is either an x-ray beam or visible light. After passing through the aperture A, the beam 170 is directed upon the surface 72 of the optical detector 22.

The alignment system 180 includes at least one motor 182, 184, 186, where a specific motor translates the aperture A along a selected axis of a three-dimensional Cartesian coordinate system. The three-dimensional Cartesian coordinate system expresses a location of a point in space using an x-coordinate, a y-coordinate, and a z-coordinate. In the embodiment as shown in FIG. 5, the alignment system 180 includes a first motor 182, a second motor 184, and a third motor 186. The motors 182, 184, and 186 may be, for example, nanomotors and are in signal communication with the controller 90.

The first motor 182 is configured to translate the aperture A along an x-axis of the three-dimensional Cartesian coordinate system. The second motor 184 is configured to translate the aperture A along a y-axis that is perpendicular to the x-axis. The third motor 186 is configured to translate the aperture A along a z-axis, which is perpendicular to both the x-axis and the y-axis. Referring to FIGS. 4 and 5, controller 90 instructs the alignment system 180 to translate the aperture A along at least one axis of the three-dimensional Cartesian coordinate system based on a location of the light spot 68 on the surface 72 of the optical detector 22.

Turning now to FIG. 6, in another embodiment the adjustable sizing mechanism 190 is provided for determining the size and the shape of the aperture A. The sizing mechanism 190 includes two flat, plate-shaped shutters 192, 194. The shutters 192, 194 are positioned by a motor 196 such as, for example, a nanomotor. One of the shutters is a fixed shutter 192, and a remaining shutter is a moveable shutter 194. The motor 196 may be connected to drive, or include, a threaded shaft 100 that threads into a boss 102 that may be connected to the shutter 194. The motor 196 may be mounted on a fixed support such as a fixed shaft 104, which may be held in place by a boss 106 attached to the fixed shutter 192. The moveable shutter 194 translates in a first direction D1 along a surface 112 of a wall segment 114 towards the fixed shutter 192 in order to decrease the size of the aperture A. The decreased size of the aperture A is illustrated in FIG. 6 in phantom or dashed lines. Similarly, the movable shutter 194 translates in a second direction D2 away from the fixed shutter 192 in order to increase the size of the aperture A. The increased size of the aperture A is illustrated in FIG. 5 in phantom or dashed lines as well. The controller 90 actuates the motor 196 in order to vary the size of the aperture A.

In the embodiment as shown, the two shutters 192, 194 include a parallelogram-shaped profile, and are positioned to overlap one another. As a result of the shape and orientation of the shutters 192, 194, the aperture A includes a triangular-shaped profile. However, this embodiment is merely exemplary in nature. Indeed, the shutters 192, 194 may include a number of shapes. Moreover, the aperture A is not limited to a triangular-shaped profile. For example, in another embodiment the shutters 192, 194 are changed in order to create a circular-shaped, a rectangle-shaped, or an irregularly-shaped aperture as well. Specifically, the shutters 192, 194 are capable of being replaced with an alternative set of shutters having a different profile in order to create an aperture having another profile. Referring to both FIGS. 4 and 6, the controller 90 instructs the sizing mechanism 190 to either increase or decrease the size of the aperture A based on the size of the light spot 68 on the surface 72 of the optical detector 22.

FIG. 7 is an alternative illustration of an x-ray backscattering imaging system 200. The x-ray backscattering imaging system 200 includes similar elements as the system 10 shown in FIGS. 1 and 2A, except that a container 262 is positioned at the axis of rotation A-A within a rotating wheel or drum 240. Similar to illustrations as shown in FIG. 2A, the container 262 is also used to contain a radioactive source 242 therein, and a light emitting element 256 is placed within a collimator 264. The radioactive source 242 may be a gamma source, an alpha source, a beta source, a neutron source, or an x-ray generator. An x-ray generator contains an x-ray tube (not illustrated) to produce x-rays. An x-ray tube is a vacuum tube that converts electrical power into x-rays. Specifically, the x-ray tube produces x-rays by accelerating electrons into a target based on a high positive voltage difference between the target and an electron source. In one particular embodiment, the x-ray tube may be used to produce Bremsstrahlung radiation. The drum 240 includes a plurality of spokes 298, where the spokes 298 surround the container 262.

In addition to a central container 262, the embodiment shown in FIG. 7 differs from the system 10 shown in FIGS. 1 and 2A in that a selected one of the spokes 298 includes the collimator 264. Continuing to refer to FIG. 7, the container 262 defines an interior opening 202. A first, proximate end 204 of the collimator 264 is connected to the opening 202 of the container 262. A second, distal end 210 of the collimator 264 terminates at an aperture A1P. The aperture A1P is located along an outermost surface 174 of the drum 240. As seen in FIG. 7, an aperture opening diameter of the collimator 264 is denoted as D1P and a length and of the collimator 264 is denoted as L1P.

In the embodiment as shown, the light emitting element 256 is positioned between the opening 202 and the aperture A1P of the collimator 64. However, it is to be appreciated that the light emitting element 256 may be placed at any position along the length L1P of the collimator 264. In one embodiment, the light emitting element 256 is positioned within the collimator 264 directly adjacent to the aperture A1P. In another embodiment, the light emitting element 256 is positioned within the container 262, and in a location directly adjacent to the opening 202 of the collimator 264. Similar to the embodiment as shown in FIG. 2B, the container 262 also includes a shutter (not illustrated in FIG. 7) for selectively blocking radiation generated by the radioactive source 242.

Similar to the embodiments described above and shown in FIGS. 2A and 2B, the collimator 264 collimates the radiation generated by the radioactive source 242. Specifically, the collimator 264 filters a stream of x-rays generated by the radioactive source 242 such that only the x-rays traveling substantially parallel with respect to the length L1P of the collimator 264 are allowed to pass through and exit the aperture A1P. Similarly, the collimator 264 also collimates the visible light generated by the light emitting element 256. The visible light also travels in a path along the length L1P of the collimator 264 and exits the aperture A1P, and travels in a direction within the collimator 264 that is substantially parallel with respect to the x-rays. The x-rays generated by the radioactive source 242 travel through a scanning window 280, which is an opening defined by an exterior shield 236, and exit the x-ray backscattering imaging system 200.

Figure 8:
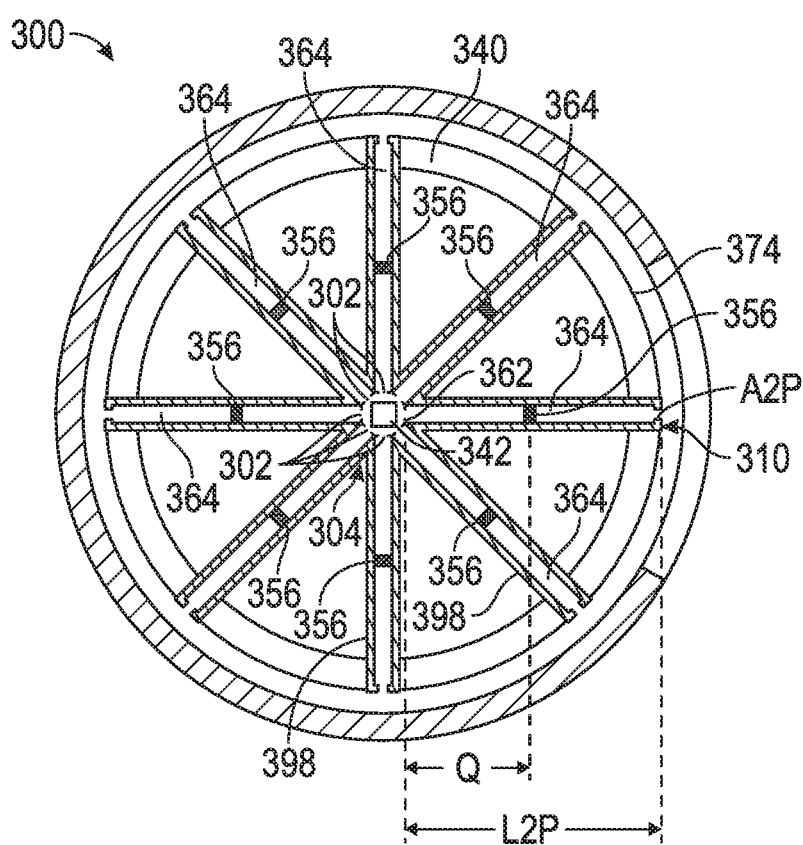
FIG. 8 is yet another alternative illustration of the x-ray backscattering imaging system shown in FIG. 1 including a rotating drum with multiple spokes that each act as a collimator.

FIG. 8 is an illustration of an x-ray backscattering imaging system 300. The x-ray backscattering imaging system 300 includes similar elements as the system 10 shown in FIGS. 1 and 2A, except that a container 362 is positioned at the axis of rotation A-A of a drum 340. Also, the drum 340 includes a plurality of spokes 398 that surround the container 362, and each spoke 398 of a drum 340 defines a unique collimator 364. The container 362 contains a radioactive source 342 therein. Similar to the embodiment as shown in FIG. 7, the radioactive source 342 may be a gamma source, an alpha source, a beta source, a neutron source, or an x-ray generator having an x-ray tube. In one particular embodiment, the x-ray tube may be used to produce Bremsstrahlung radiation. Each collimator 364 includes a first, proximate end 304 connected to a corresponding opening 302 defined by the container 362. A second, distal end 310 of the collimator 364 terminates at a corresponding aperture A2P. Each aperture A2P is located along an outermost surface 374 of the drum 340. A corresponding light emitting element 356 is provided for each collimator 364. For example, in the embodiment as shown in FIG. 8 there are eight light emitting elements 356 that are provided for a corresponding one of the collimators 364. As seen in FIG. 8, each light emitting element 356 is positioned along a length L2P of a corresponding collimator 364 at the same location. That is, in other words, a distance measured between each light emitting element 356 and a corresponding aperture A2P is the same.

In the embodiment as shown in FIG. 8, each light emitting element 356 is positioned between a corresponding one of the openings 302 and a corresponding aperture A2P of one of the collimators 364. However, it is to be appreciated that the light emitting element 356 may be placed at any position along the length L2P of each collimator 364, as long as the distance Q for each light emitting element 356 is the same. In one embodiment, the light emitting elements 356 may be positioned by a corresponding collimator 364 in a location directly adjacent to a corresponding aperture A2P. In another embodiment, the light emitting elements 356 may be positioned within the container 362, and in a location directly adjacent to a corresponding one of the openings 302 of the collimator 364. Similar to the embodiment as shown in FIG. 2B, the container 362 may also include a plurality of shutters (not illustrated in FIG. 8) for selectively blocking radiation generated by the radioactive source 342.

Figure 9:
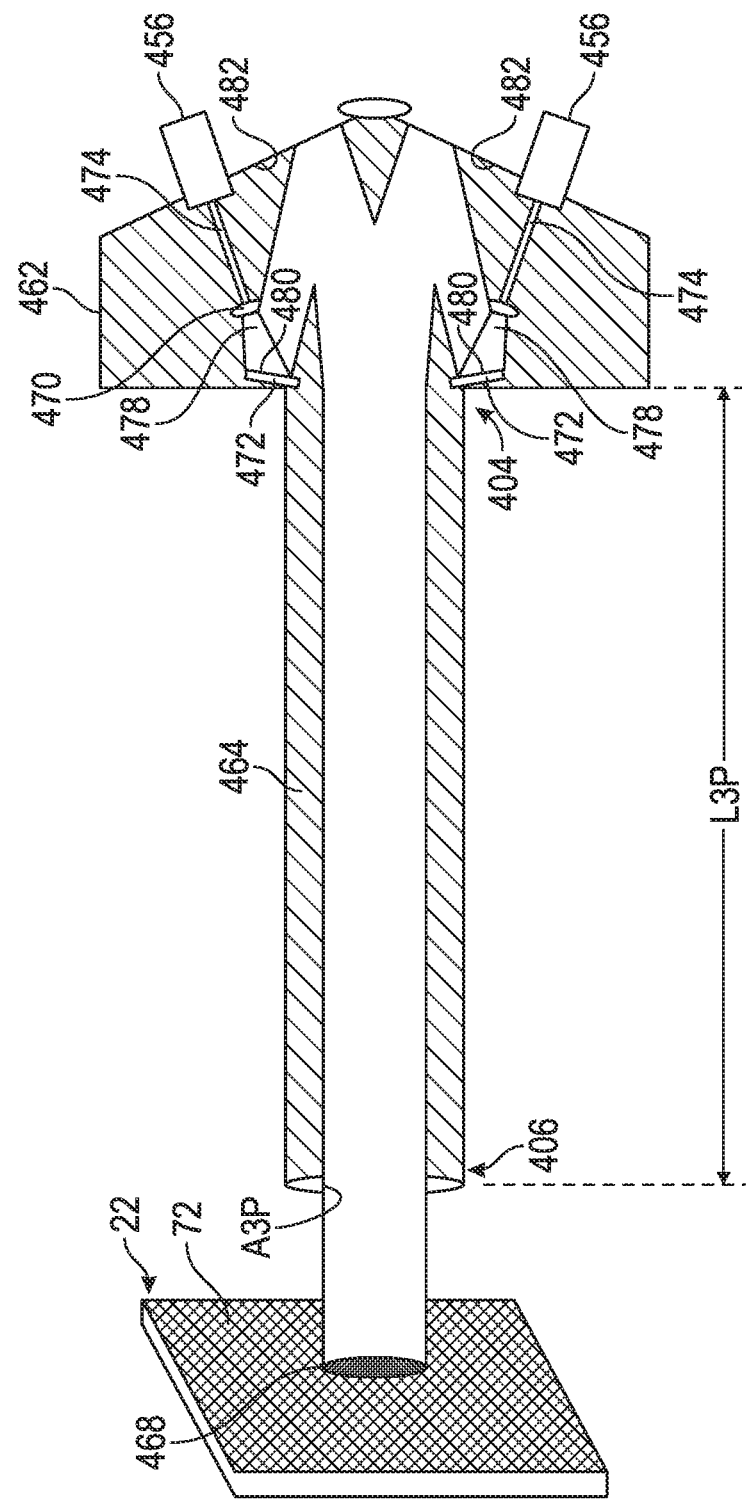
FIG. 9 is still another alternative illustration of the x-ray backscattering imaging system shown in FIG. 1, where laser diodes are the light emitting element.

FIG. 9 is an alternative embodiment of the light emitting element 56 and collimator 64 shown in FIG. 2A, where one or more laser diodes 456 are now the light emitting element. The laser diodes 456 may also be referred to as injection lasers or diode lasers, and are semiconductor devices that produce coherent radiation in the visible spectrum. In one embodiment, the laser diodes 456 may be visible VCSELs (Vertical Cavity Surface Emitting Lasers) that emit visible light in the red spectrum, standard laser diodes, a pumped semiconductor laser, or a gas laser such as a helium neon (HeNe) laser. FIG. 9 illustrates an exemplary collimator 464 and a portion of a container 462. The collimator 464 includes a first proximate end 404 and a second distal end 406. The container 462 also contains a radioactive source that is not visible in FIG. 9. It is to be appreciated that the collimator 464 and the laser diodes 456 are capable of being used in any of the configurations of the x-ray backscattering imaging systems 10, 200, and 300 shown in FIGS. 2A-2B, 7 and 8.

Each laser diode 456 is provided with a lens 470 and a reflecting element 472. The laser diodes 456 each generate a laser beam 474 traveling in a direction towards a corresponding lens 470 and reflector 472. The lens 470 disperses the laser beam 474 generated by a corresponding laser diode 456 into a stream of dispersed visible light 478. The lens 470 is positioned within the container 462 so as to direct the visible light 478 upon a mirrored surface 480 of a corresponding reflecting element 472. In one approach, the reflecting elements 472 are micromirrors having an aluminum reflective coating. The visible light 478 is then directed towards a surface 482 within the container 462. The surface 482 is oriented so as to direct the visible light 478 into the collimator 464. The reflecting elements 472 are of sufficient size to re-direct the visible light 478 through the collimator 464, where the visible light 478 completely fills the collimator 464.

The visible light 478 travels along a length L3P of the collimator 464 and exits an aperture A3P located at the distal end 406 of the collimator 464. The visible light 478 is directed upon a surface, such as the surface 72 of the optical detector 22 which is described above and illustrated in FIG. 4. The visible light 478 creates a light spot 468 upon the surface 72 of the optical detector 22. Alternatively, in another embodiment, the visible light 478 creates the light spot 468 upon an exterior surface 20 of the structure 18 (shown in FIG. 1) that is being inspected.

Figure 10:
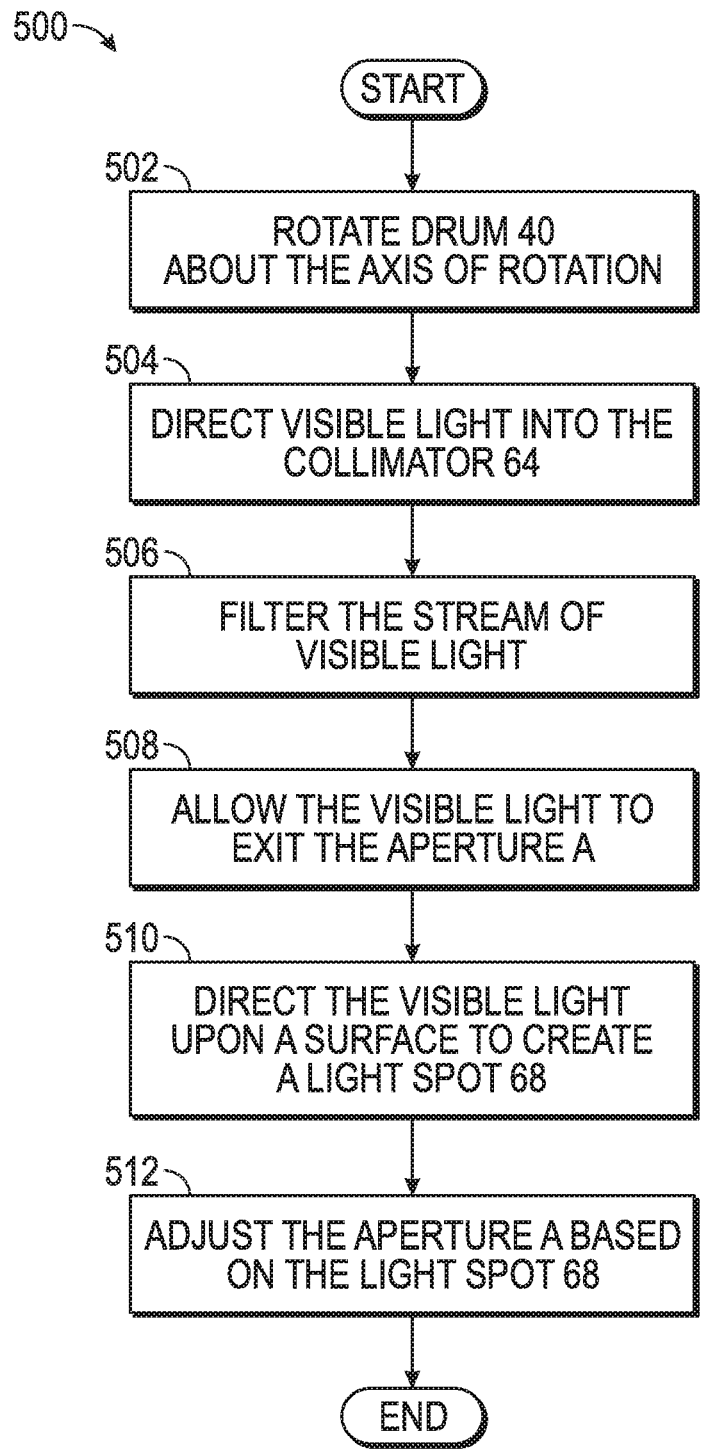
FIG. 10 is an exemplary process flow diagram illustrating a method for calibrating the disclosed x-ray backscattering imaging system.

FIG. 10 is an exemplary process flow diagram illustrating a method 500 for creating the light spot 68 shown in FIG. 4. Referring generally to FIGS. 1, 2A, 2B, 3, 4, and 10 the method 500 begins at block 502. In block 502, the drum 40 is rotated about the axis of rotation A-A at the rotational speed. As seen in FIGS. 2A and 2B, the container 62 is connected to the drum 40 and houses the radioactive source 42 that generates x-ray beams. Method 500 may then proceed to block 504.

In block 504, the visible light generated by the visible light element 56 is directed into the collimator 64 defined by the container 62. As mentioned above and seen in FIG. 2A, the collimator 64 filters the stream of x-rays generated by the radioactive source 42 such that the x-ray beams traveling substantially parallel with respect to the length of the collimator 64 pass through the aperture A. Method 500 may then proceed to block 506.

In block 506, the method 500 includes filtering the stream of visible light generated by the light emitting element 56 by the collimator 64. Method 500 may then proceed to block 508.

In block 508, the visible light traveling substantially parallel with respect to the length of the collimator 64 is allowed to pass through the aperture A. As mentioned above, the visible light passing through the aperture A is coincident and substantially parallel with respect to the x-ray beams that pass through the aperture A. Method 500 may then proceed to block 510.

In block 510, the visible light exiting the aperture A of the collimator is directed upon a surface to create the light spot 68. Specifically, in the embodiment as shown in FIG. 4, the light spot 68 is directed upon the surface 72 of the optical detector 22. However, as mentioned above, in one embodiment the optical detector 22 is optional. Instead, the light spot 68 is directed upon the exterior surface 20 of the structure 18 shown in FIG. 1. Method 500 may then proceed to block 512.

In block 512, the aperture A is adjusted based on the light spot 68. Specifically, in one embodiment the size, shape, and location of the light spot 68 are adjusted automatically by the controller 90 of the x-ray backscattering imaging system 10. In another embodiment, an operator may manually adjust the size, shape, and location of the light spot 68. Method 500 may then terminate.

Referring generally to FIGS. 1-10, the disclosed x-ray backscattering imaging system includes a visual light calibration feature that allows for an operator to make adjustments to the size, shape, and location of a collimator's aperture. Accordingly, every time the x-ray backscattering imaging system is activated for use, a calibration procedure may be conducted to adjust the size, shape, and location of the aperture. The calibration of the aperture is completed using the visible light generated by the disclosed light emitting element. Once calibration is complete, the x-ray backscattering imaging system may inspect a structure by detecting backscattering radiation created as the x-rays generated by the radioactive source scatter back from the structure. Thus, an operator is able to calibrate the size, shape, and location of the x-rays, without being subjected to the radiation generated by the radioactive source. Furthermore, in the event more than one collimator is included, the disclosed system may substantially eliminate vertical streaking from an image. The disclosed system may also improve a signal-to-noise value and spatial resolution of the image, which also improves the overall quality of the image.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. An x-ray backscattering imaging system for creating a backscatter image representing a structure, comprising:
    a drum rotatable about an axis of rotation at a rotational speed;
    a radioactive source connected to the drum, wherein the radioactive source generates x-ray beams;
    a container housing the radioactive source, the container constructed of a material that substantially blocks the x-ray beams generated by the radioactive source;
    at least one collimator defined by the container, the collimator having a length and an aperture, wherein the collimator filters a stream of x-rays generated by the radioactive source such that the x-ray beams traveling substantially parallel with respect to the length of the collimator pass through the aperture;
    at least one light emitting element for generating visible light, the light emitting element positioned to intersect with the x-ray beams generated by the radioactive source and to direct the visible light into the collimator, wherein the collimator filters a stream of visible light generated by the light emitting element such that the visible light traveling substantially parallel with respect to the length of the collimator passes through the aperture, and wherein the visible light passing through the aperture is coincident and substantially parallel with respect to the x-ray beams that pass through the aperture; and
    a plurality of backscatter detectors for detecting backscattering radiation created as the x-rays generated by the radioactive source scatter back from the structure.

2. The x-ray backscattering imaging system of claim 1, comprising an optical detector, wherein the visible light exiting the aperture of the collimator is directed upon a surface of the optical detector to create a light spot.

3. The x-ray backscattering imaging system of claim 2, wherein the surface of the optical detector includes a plurality of pixels, and wherein the optical detector creates a voltage at each pixel illuminated by the light spot.

4. The x-ray backscattering imaging system of claim 2, comprising a controller in signal communication with the optical detector and an alignment system, wherein the controller instructs the alignment system to translate the aperture along at least one axis of a three-dimensional Cartesian coordinate system based on a location of the light spot.

5. The x-ray backscattering imaging system of claim 2, comprising a controller in signal communication with the optical detector and a sizing mechanism, wherein the controller instructs the sizing mechanism to either increase or decrease a size of the aperture based on a size of the light spot.

6. The x-ray backscattering imaging system of claim 1, wherein the visible light passing through the aperture of the collimator is directed upon an exterior surface of the structure and creates a light spot.

7. The x-ray backscattering imaging system of claim 6, wherein the light spot is representative of a size, a shape, and a location of the x-rays generated by the radioactive source.

8. The x-ray backscattering imaging system of claim 1, wherein the light emitting element is selected from the group consisting of: a light emitting diode (LED) and an organic LED (OLED).

9. The x-ray backscattering imaging system of claim 1, wherein the container is positioned at the axis of rotation of the drum, and the drum includes a plurality of spokes that surround the container.

10. The x-ray backscattering imaging system of claim 9, wherein a selected one of the spokes includes the collimator.

11. The x-ray backscattering imaging system of claim 9, wherein each spoke of the drum defines a unique collimator, and wherein each unique collimator is provided with a corresponding light emitting element.

12. The x-ray backscattering imaging system of claim 1, comprising an alignment system including at least one motor, wherein the motor translates the aperture along a selected axis of a three-dimensional Cartesian coordinate system.

13. The x-ray backscattering imaging system of claim 1, comprising a sizing mechanism for determining a size and a shape of the aperture, wherein the sizing mechanism includes a fixed shutter and a moveable shutter.

14. The x-ray backscattering imaging system of claim 13, wherein the moveable shutter translates in a first direction towards the fixed shutter to decrease the size of the aperture and in a second direction away from the fixed shutter to increase the size of the aperture.

15. A method of calibrating an x-ray backscattering imaging system for creating a backscatter image representing a structure, the method comprising:
rotating a drum about an axis of rotation at a rotational speed, wherein a container is connected to the drum and houses a radioactive source that generates x-ray beams;
directing visible light generated by a light emitting element into a collimator defined by the container, wherein the collimator includes a length and an aperture, and the light emitting element is positioned to intersect with the x-ray beams generated by the radioactive source;
filtering a stream of visible light generated by the light emitting element by the collimator;
allowing the visible light traveling substantially parallel with respect to the length of the collimator to pass through the aperture, wherein the visible light passing through the aperture is coincident and substantially parallel with respect to the x-ray beams generated by the radioactive source that pass through the aperture;
directing the visible light exiting the aperture of the collimator upon a surface to create a light spot; and
adjusting at least one of a size, shape, and location of the aperture of the collimator based on the light spot.

16. The method of claim 15, comprising filtering a stream of x-rays generated by the radioactive source by the collimator such that the x-ray beams traveling substantially parallel with respect to the length of the collimator pass through the aperture.

17. The method of claim 15, comprising creating the light spot upon either an exterior surface of the structure or a surface of an optical detector.

18. An x-ray backscattering imaging system for creating a backscatter image representing a structure, comprising:
a drum rotatable about an axis of rotation at a rotational speed;
a radioactive source connected to the drum, wherein the radioactive source generates x-ray beams;
a container housing the radioactive source, the container constructed of a material that substantially blocks the x-ray beams generated by the radioactive source;
at least one collimator defined by the container, the collimator having a length and an aperture, wherein the collimator filters a stream of x-rays generated by the radioactive source such that the x-ray beams traveling substantially parallel with respect to the length of the collimator pass through the aperture;
at least one light emitting element for generating visible light, the light emitting element positioned to direct the visible light into the collimator, wherein the collimator filters a stream of visible light generated by the light emitting element such that the visible light traveling substantially parallel with respect to the length of the collimator passes through the aperture, and wherein the visible light passing through the aperture is coincident and substantially parallel with respect to the x-ray beams that pass through the aperture;
a plurality of backscatter detectors for detecting backscattering radiation created as the x-rays generated by the radioactive source scatter back from the structure;
an optical detector, wherein the visible light exiting the aperture of the collimator is directed upon a surface of the optical detector to create a light spot; and
a controller in signal communication with the optical detector and an alignment system, wherein the controller instructs the alignment system to translate the aperture along at least one axis of a three-dimensional Cartesian coordinate system based on a location of the light spot.

19. An x-ray backscattering imaging system for creating a backscatter image representing a structure, comprising:
a drum rotatable about an axis of rotation at a rotational speed;
a radioactive source connected to the drum, wherein the radioactive source generates x-ray beams;
a container housing the radioactive source, the container constructed of a material that substantially blocks the x-ray beams generated by the radioactive source;
at least one collimator defined by the container, the collimator having a length and an aperture, wherein the collimator filters a stream of x-rays generated by the radioactive source such that the x-ray beams traveling substantially parallel with respect to the length of the collimator pass through the aperture;
at least one light emitting element for generating visible light, the light emitting element positioned to direct the visible light into the collimator, wherein the collimator filters a stream of visible light generated by the light emitting element such that the visible light traveling substantially parallel with respect to the length of the collimator passes through the aperture, and wherein the visible light passing through the aperture is coincident and substantially parallel with respect to the x-ray beams that pass through the aperture;

a plurality of backscatter detectors for detecting backscattering radiation created as the x-rays generated by the radioactive source scatter back from the structure;

an optical detector, wherein the visible light exiting the aperture of the collimator is directed upon a surface of the optical detector to create a light spot; and a controller in signal communication with the optical detector and a sizing mechanism, wherein the controller instructs the sizing mechanism to either increase or decrease a size of the aperture based on a size of the light spot.

20. An x-ray backscattering imaging system for creating a backscatter image representing a structure, comprising:

a drum rotatable about an axis of rotation at a rotational speed;

a radioactive source connected to the drum, wherein the radioactive source generates x-ray beams;

a container housing the radioactive source, the container constructed of a material that substantially blocks the x-ray beams generated by the radioactive source;

at least one collimator defined by the container, the collimator having a length and an aperture, wherein the collimator filters a stream of x-rays generated by the radioactive source such that the x-ray beams traveling substantially parallel with respect to the length of the collimator pass through the aperture;

at least one light emitting element for generating visible light, the light emitting element positioned within the collimator so as to intersect with the x-rays beams generated by the radioactive source and directs the visible light into the collimator, wherein the collimator filters a stream of visible light generated by the light emitting element such that the visible light traveling substantially parallel with respect to the length of the collimator passes through the aperture, and wherein the visible light passing through the aperture is coincident and substantially parallel with respect to the x-ray beams that pass through the aperture, and wherein the light emitting element is selected from the group consisting of: a light emitting diode (LED) and an organic LED (OLED); and a plurality of backscatter detectors for detecting backscattering radiation created as the x-rays generated by the radioactive source scatter back from the structure.

21. An x-ray backscattering imaging system for creating a backscatter image representing a structure, comprising:

a drum rotatable about an axis of rotation at a rotational speed;

a radioactive source connected to the drum, wherein the radioactive source generates x-ray beams;

a container housing the radioactive source, the container constructed of a material that substantially blocks the x-ray beams generated by the radioactive source;

at least one collimator defined by the container, the collimator having a length and an aperture, wherein the collimator filters a stream of x-rays generated by the radioactive source such that the x-ray beams traveling substantially parallel with respect to the length of the collimator pass through the aperture;

at least one light emitting element that is a plurality of diode lasers for generating visible light, the light emitting element positioned to direct the visible light into the collimator, wherein the collimator filters a stream of visible light generated by the light emitting element such that the visible light traveling substantially parallel with respect to the length of the collimator passes through the aperture, and wherein the visible light passing through the aperture is coincident and substantially parallel with respect to the x-ray beams that pass through the aperture;

a plurality of backscatter detectors for detecting backscattering radiation created as the x-rays generated by the radioactive source scatter back from the structure; and a lens and a reflecting element provided for each of the plurality of diode lasers, wherein each lens disperses a laser beam generated by a corresponding laser diode into a stream of dispersed visible light.

22. An x-ray backscattering imaging system for creating a backscatter image representing a structure, comprising:

a drum rotatable about an axis of rotation at a rotational speed;

a radioactive source connected to the drum, wherein the radioactive source generates x-ray beams;

a container housing the radioactive source, the container constructed of a material that substantially blocks the x-ray beams generated by the radioactive source, wherein the container is positioned at the axis of rotation of the drum, and the drum includes a plurality of spokes that surround the container;

at least one collimator defined by the container, the collimator having a length and an aperture, wherein the collimator filters a stream of x-rays generated by the radioactive source such that the x-ray beams traveling substantially parallel with respect to the length of the collimator pass through the aperture, and wherein each spoke of the drum defines a unique collimator, and wherein each unique collimator is provided with a corresponding light emitting element;

at least one light emitting element that is a plurality of laser diodes for generating visible light, the light emitting element positioned to direct the visible light into the collimator, wherein the collimator filters a stream of visible light generated by the light emitting element such that the visible light traveling substantially parallel with respect to the length of the collimator passes through the aperture, and wherein the visible light passing through the aperture is coincident and substantially parallel with respect to the x-ray beams that pass through the aperture; and a plurality of backscatter detectors for detecting backscattering radiation created as the x-rays generated by the radioactive source scatter back from the structure.

* * * * *